United States Patent [19]

Thiel

[11] 4,405,612

[45] Sep. 20, 1983

[54] HEPARIN WEB COMPOSITIONS

[75] Inventor: Charles G. Thiel, St. Paul, Minn.

[73] Assignee: Riker Laboratories, Inc., St. Paul, Minn.

[21] Appl. No.: 267,579

[22] Filed: May 21, 1981

Related U.S. Application Data

[63] Continuation-in-part of Ser. No. 152,751, May 23, 1980, abandoned.

[51] Int. Cl.³ .................. A61K 31/725; D04H 1/04; C08B 37/10
[52] U.S. Cl. .................. 424/183; 428/288; 428/401; 428/903; 536/21
[58] Field of Search .............. 536/21; 424/183; 428/288, 401, 903

[56] References Cited

U.S. PATENT DOCUMENTS

| | | | |
|---|---|---|---|
| 3,634,123 | 1/1972 | Eriksson et al. | 424/183 |
| 3,673,612 | 7/1972 | Merrill | 424/183 |
| 4,048,064 | 9/1977 | Clark | 424/183 |
| 4,073,723 | 2/1978 | Swank et al. | 424/183 |
| 4,168,377 | 9/1979 | Choay et al. | 536/21 |
| 4,178,941 | 12/1979 | Raitto | 128/763 |
| 4,203,891 | 5/1980 | Rock | 424/183 |
| 4,234,652 | 11/1980 | Vanoni et al. | 428/903 |

FOREIGN PATENT DOCUMENTS

| | | | |
|---|---|---|---|
| 2806515 | 8/1979 | Fed. Rep. of Germany | 536/21 |
| 899329 | 6/1962 | United Kingdom | 128/763 |

Primary Examiner—Johnnie R. Brown
Attorney, Agent, or Firm—Cruzan Alexander; Donald M. Sell; Robert W. Sprague

[57] ABSTRACT

Microfibrous heparin salts, nonwoven webs of such fibers, a process for preparing the fibers and the use of the webs for the rapid heparinization of blood are disclosed.

24 Claims, 3 Drawing Figures

HEPARIN WEB COMPOSITIONS

CROSS REFERENCE TO RELATED APPLICATION

This is a continuation-in-part of application Ser. No. 152,751, filed May 23, 1980, now abandoned.

TECHNICAL FIELD

The heparinizing of blood, especially for use in the in vitro testing of blood samples.

BACKGROUND ART

Heparin is normally provided by the pharmaceutical industry as an alkali metal (for example, primarily sodium) or alkaline earth (for example calcium) salt in view of the limited stability of the free acid form of heparin. The salts are most commonly provided for pharmaceutical use in the form of solutions. Solid heparin salts tend to be somewhat hygroscopic and gradually absorb water unless maintained in a low humidity environment. They are amorphous rather than crystalline and are available as fine powders.

Both the solution and solid forms of the heparin salts are conventionally utilized in blood-gas analyses wherein they serve as anticoagulants to maintain liquidity of the blood being tested. Blood-gas analyses are widely used in diagnostic medicine, oxygen and carbon dioxide contents of blood samples being of particular importance. From such measurements, a physician may obtain accurate oxygen level readings from which he may more accurately anticipate the patient's supplementary oxygen needs.

The measurement of arterial blood gas normally involves drawing a sample of blood into a syringe containing an anticoagulant and then injecting the blood sample into an analyzing instrument. The anticoagulant is used to maintain the liquidity of the blood sample so that the partial pressures of the blood gases are at substantially the same level as when initially drawn.

Even though the procedure seems simple and straightforward there are numerous opportunities for sources of error to be introduced. One particular source of error has been found to result from the method in which the anticoagulant is added to the drawn blood samples.

There are three primary methods for the introduction of an anticoagulant such as heparin into the blood samples. The first method involves the drawing of a quantity of heparin solution into a syringe in order to wet the interior walls. A substantial portion of the excess heparin is ejected and the blood is then drawn into the syringe from the patient. The blood when drawn mixes with the heparin solution to prevent coagulation. The error in this method results from the fact that an indeterminate amount of heparin solution remains in the syringe interior, needle hub and cannula. As a result, the drawn blood sample is diluted by an indeterminate amount of heparin solution which in most cases leads to less accurate blood gas data.

A second method involves the use of preheparinized syringes. These syringes are prepared by depositing a lyophilized heparin on the internal surface of the syringe. They have been found to vary in the location and the amount of heparin on the syringe barrel wall. Also, the deposited heparin dissolution rate into the blood is slower than optimal and is unpredictable. This slow dissolution rate combined with the variability in amount allows partial blood coagulation thereby introducing a source of error into the analysis. Because lyophilized heparin is more difficult and complex to manufacture and use than a heparin solution, these preheparinized syringes have been found to be much more costly without proportionately minimizing the amount of potential error.

A third method recently introduced comprises placing an anticoagulant tablet in the hub of the needle of the syringe used to obtain a blood sample from a patient. The blood flowing through the needle and into the syringe dissolves the tablet and the blood is heparinized. These tablets are comprised of a salt of heparin, a tablet binder and a pH controlling substance. Although the rate of dissolution of these tablets is fast compared to the heparinized syringe, the time required for disintegration is up to 20 seconds, and for complete dissolution up to two minutes. Also, the use of these tablets requires a mixing step after the blood is drawn into the syringe. The tablet binder and pH controlling substance are adjuvants requiring added cost and additional manufacturing complexities.

DISCLOSURE OF THE INVENTION

The present invention relates to microfibers of amorphous heparin salts which have average length to diameter ratios of at least 20 (and preferably at least 80), to open, nonwoven webs of the fibers, to processes for their preparation and to a method for heparinizing blood which comprises intermixing heparin salt microfibers (ordinarily a web of such fibers) with blood. The microfibers are of particular use in in vitro blood test procedures. They provide a much more rapidly dissolving heparin source which does not dilute the blood which is heparinized. They are easily and inexpensively prepared and can be conveniently quantized in individual test needles and syringes.

The process of the invention comprises expressing an aqueous heparin salt solution into a large excess of a fluid which is a nonsolvent for the heparin salt. It has in fact been discovered in connection with the present invention that when a much greater proportion of the fluid nonsolvent (a gas stream such as air or nitrogen or a liquid nonsolvent such as isopropanol) is utilized, the water can be removed very rapidly from the heparin salt solution while the latter is in rapid laminar motion and the heparin salt fibers are formed, rather than a blocky precipitate. Thus, in the case of a liquid nonsolvent, the ratio (by volume) of the nonsolvent to the aqueous heparin salt solution is 10 or greater (e.g. from 10 to 50) and is preferably 20 or more.

BRIEF DESCRIPTION OF THE DRAWINGS

A better understanding of the present invention may be obtained with reference to the drawings wherein.

Figure 1:
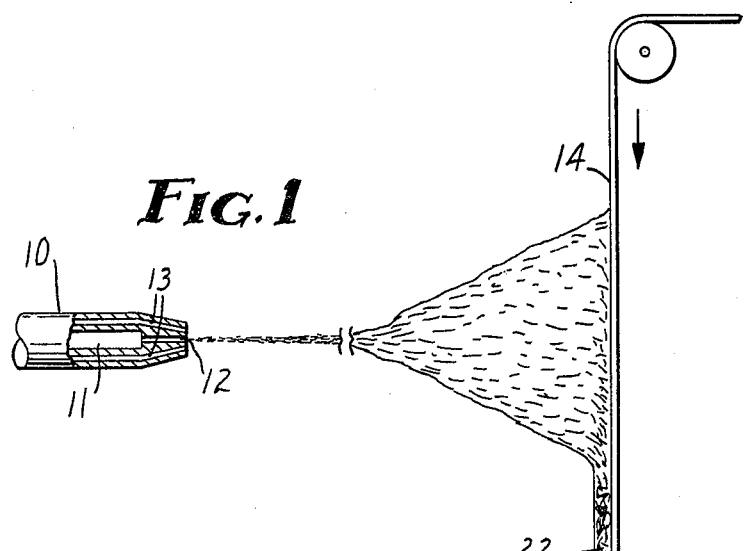
FIG. 1 is a schematic diagram of an apparatus for preparing a microfibrous web of the present invention.

In the apparatus of FIG. 1, the microfibers are formed in a stream of an inert gas. The microfiber-blowing portion of the apparatus can be a conventional structure as taught, for example, in Wente, Van A., "Superfine Thermoplastic Fibers", in Industrial Engineering Chemistry, Vol. 48, pages 1342 et seq (1956), or in Report No. 4364 of the Naval Research Laboratories, published May 25, 1954, entitled "Manufacture of Superfine Organic Fibers" by Wente, V. A.; Boone, D. C.; and Fluharty, E. L. Such a structure includes a die 10 through which a solution injection chamber 11 through which liquified fiber-forming solution is advanced; die orifices 12 arranged in line across the forward end of the die and through which the fiber-forming solution is directed; and cooperating gas orifices 13 through which a gas, typically air or nitrogen, is forced at very high velocity. The high-velocity gaseous stream draws out and attenuates the extruded fiber-forming heparin solution, whereupon the fiber-forming heparin solidifies as microfibers during travel to a collector 14. The collector 14 is typically a finely perforated screen, which in this case is in the form of a closed-loop belt, but which can take alternative forms, such as a flat screen or a drum or cylinder. Gas-withdrawal apparatus may be positioned behind the screen to assist in deposition of the microfibrous web 22 and removal of gas. It will be understood by the art that operating conditions must be controlled to avoid decomposition of the heparin.

Figure 2:
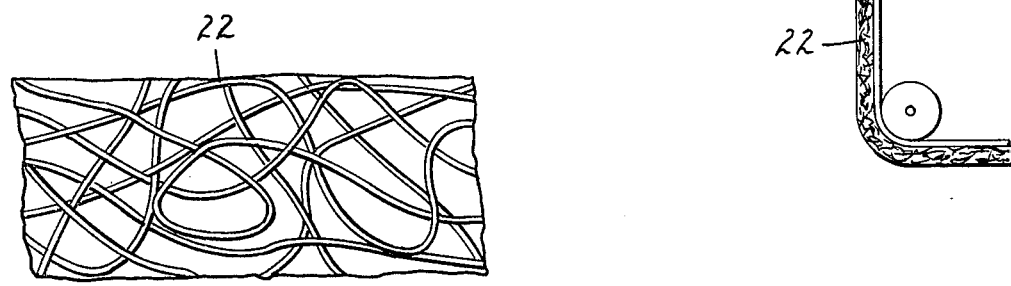
FIG. 2 is an enlarged section through a microfibrous web of the present invention.

The web, as shown in FIG. 2, can be cut or shaped into a variety of forms, e.g. plugs, discs, cubes, etc. The crossover points of the individual fibers in the webs may be partly or completely fused.

Figure 3:
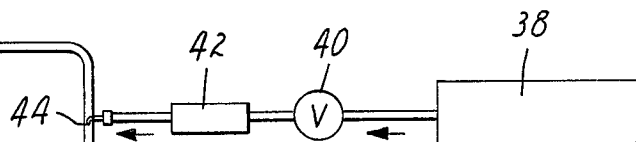
FIG. 3 is a schematic diagram illustrative of an alternative apparatus for the preparation of a microfibrous web of the present invention.

The apparatus shown in FIG. 3 forms the webs by precipitating the microfibers from solution. The apparatus includes a heparin solution injecting portion, a nonsolvent fluid circulating system and a web take-off portion. The fluid system is comprised of a collection reservoir 30 and a filament attenuation section 36. In line between the reservoir 30 and attenuation section 36 is a pump 32 and a flow meter 34 which may be used to control the flow rate of the fluid. The selection of the fluid is dependent on the environment in which the heparin is to be used. The heparin solution is injected into the fluid path at filament attenuation section 36 through injection orifice 44. The heparin solution enters injection orifice 44 from the heparin reservoir 38 after passing through control valve 40 and flow meter 42. The movement of the heparin solution may be facilitated by numerous means known to the art, e.g. a pump, air pressure, etc. As with the air-blown system, it is necessary that the fluid stream have a relative velocity greater than that of the injected stream of the heparin. The combined streams (e.g. fluid and heparin) are directed to the web take-off portion which is comprised of a movable collector 48 where the microfibers are collected in web form and the fluid returns to the fluid reservoir 30 for recycling. Screen 48 movement is facilitated by rollers 51 and 53 and motor 52. The width of the formed web 54 is controlled by the gauge bars 46. The web 54 passes under a wringer roller 50 which further aids in the removal of the fluid from web 54. Web 54 may then be directed to a drier or to further processing as desired.

DETAILED DESCRIPTION

The heparin salt webs of the invention are, as noted previously, particularly useful in and adapted for certain in vitro blood tests, e.g. in which the blood is subjected to them immediately upon being drawn from a mammalian subject in order to stabilize the blood in a liquid state suitable for testing. This stabilization reaction is commonly referred to as heparinization.

The webs are, when properly packaged and stored, stable for years under ambient conditions or longer when stored cold. At relative humidities of approximately 55 percent (at ambient temperatures, e.g. 20°-25° C.) they are still stable for several months although under very high humidity conditions they absorb an excess of moisture and deform grossly. They dissolve very rapidly in aqueous solutions, including blood, due, it appears, to the open structure and relatively high surface area of the microfibers and to the absence of any solid excipient or other additive. Thus, relatively small pledgets of heparin web (less than about one cubic centimeter) have been found to dissolve completely in about one second in water or blood.

The webs are moderately stable to cobalt irradiation and can thus be easily sterilized. They are capable of absorbing up to about three megarads while retaining about 83 percent of the USP activity and 77 percent of the anti Factor $X_a$ activity of the heparin salt starting material. The density of the individual microfibers is about 1.8 g/cc. The acidity of solutions of the heparin salt microfibers depends upon the acidity of the solutions from which they were originally prepared and the acidity of the water used to dissolve them. However, the webs do not significantly affect the pH of the blood samples which are heparinized due to the relatively small amount used and the buffering capacity of blood.

The length and diameter of the microfibers is dependent upon the process used to prepare them, for example stirring rate, means of extrusion, velocity of extrusion, the nonsolvent (if any) used and the ratio of nonsolvent to water used. Generally, the shorter fibers are less useful for many purposes because they are difficult to handle and form poorer webs and mats. Thus, the average length to diameter ratio of the fibers is preferably at least 20 and is more preferably at least about 80.

The cation in the heparin salts is generally selected from group I or group II of the Periodic Table of the Elements and is normally an alkali metal, an alkaline earth or zinc, for example lithium, sodium, potassium, magnesium, calcium or zinc. Fibers of salts of heparin and all of these cations having length to diameter ratios of at least 80 are conveniently prepared by the process of the invention.

The strength and structural integrity of the webs, their ability to be cut, punched or divided into pieces of desired shapes and weights, their open structure and high surface area render them ideally suited for rapidly heparinizing blood under controlled conditions, e.g. in the blood gas analysis test. Such pieces of the web may be placed in a syringe in any acceptable way, but are preferably inserted into the hub of a needle through which blood to be analyzed is drawn. When utilized in this way the heparin web pieces heparinize the blood drawn through the needle virtually instantaneously and essentially eliminate all presently known sources of error due to inadequate heparinization during blood gas analysis. This method is faster than any previous heparinization method, and allows immediate analysis of the blood sample drawn.

The weight of the fragment to be used in a single syringe depends upon the specific USP activity of the heparin and will be gauged to provide a desired level of USP activity, for example at least 250 USP units of anticoagulant activity. The density of the web and the size of the cut piece may be varied as desired. Typical sizes are 1.5 to 4.0 mm. in diameter and 1 to 5 mm. in thickness. Thinner discs of larger diameter of heparin web of at least 250 units activity may be placed in the barrel of the syringe before inserting the plunger as an alternative to placing the web in the needle hub.

The process of preparing the microfiber, which constitutes a separate aspect of the invention, comprises expressing an aqueous heparin salt solution into a large excess of a fluid which is a nonsolvent for the heparin salt. The fluid can be gas which is inert with respect to the heparin salt, such as nitrogen or air or a liquid nonsolvent for heparin salt and the process can be carried out as a batch operation or continuously. Three more specific embodiments of the process are as follows:

1. An aqueous solution of from about 40 percent to 60 percent heparin salt by weight is expressed through a small concentric orifice into a stream of dry inert gas and blown onto a collection screen. See FIG. 1.

2. An aqueous solution of from about 10 percent (w/w) to 40 percent heparin salt by weight is expressed into a rapidly stirred dry liquid nonsolvent for heparin such as methanol, ethanol, 1-propanol, isopropanol, t-butanol, acetone and the like.

3. An aqueous solution of from 10 percent to 30 percent by weight heparin salt is continuously mixed into a stream of nonsolvent liquid and the microfibers are collected on a moving screen while the nonsolvent is recirculated and excess water is removed from the solvent stream. The concentration of nonsolvent is maintained at 95 percent or higher. See FIG. 3.

When a batch process is used with a liquid nonsolvent (2 above), the concentration of the nonsolvent must be retained at greater than 90 percent by volume at all times during the process (the remainder of less than 10 percent being the aqueous solution of the heparin salt) and preferably the concentration of the liquid nonsolvent is retained at 95 percent or even better, 99 percent or more by volume. Thus, even at 90 percent of nonsolvent liquid, the resulting microfibers are short and thin. The concentration of the liquid nonsolvent is maintained at 95 percent by volume or greater in the continuous process. In both cases, the microfibers increase in length (and hence in length to diameter ratio) as the concentration of the water decreases. The preferred liquid nonsolvent is isopropanol since it produces the best microfibers.

The microfibers obtained from the foregoing processes contain some water and, where a liquid nonsolvent has been used, normally some of it as well. The combined nonsolvent and water content of the microfibers (webs) generally ranges up to 25 percent, usually 10 to 15 percent. The webs are dried by conventional methods such as vacuum oven, streams of dry gas, expressing or centrifuging off excess fluid followed by oven or gas drying, and the like to maintain flexibility and pliability. The resulting webs may then be cut, sliced, punched or divided in other conventional ways due to the inherent strength and structural integrity of the webs. More specifically, a web of the microfibers may be dried in a vacuum oven for example at about 60° C. and will ordinarily reach desirable handling characteristics after 2 to 3 hours. Such a drying cycle typically produces product having a USP LOD (loss on drying) of about 7 to 11 percent. The drying time needed to produce such a product can be reduced by varying these conditions. When heparin salt microfibers are overdried, they become flaky and fragile but will absorb moisture under controlled humidity, e.g. about 25 to 35 percent, preferably 30 to 35 percent, from the atmosphere and again become pliable.

The following examples are given for the purpose of further illustrating the invention but are not intended, in any way, to be limiting of the scope thereof. All parts are given by weight unless otherwise specifically noted.

EXAMPLE 1

A sample of 10 g. of sodium heparin (U.S.P. activity 161 units per milligram) is dissolved in 15 g. of water to provide a solution of 40 percent by weight of sodium heparin. The solution is passed through a hypodermic needle with a tip opening of 0.84 mm. (18 gauge needle) by using a syringe as the pump. The solution expressed from the needle is blown by a stream of compressed air at a pressure of about 3400 N/m$^2$ blown through a 6.35 mm. diameter nozzle. The resulting microfibers are further attenuated and dried by blowing a stream of warm air from a heat gun over the stream issuing from the nozzle. The sodium heparin microfibers formed are collected at a web screen consisting of a 232 cm$^2$ piece of standard laboratory burner gauge. 300 Mg. of the microfibers are obtained from 3 ml. of the solution (a yield of 25 percent), and the balance of the sodium heparin is collected as droplets in a pan.

A portion of the resulting web is found to dissolve instantly in water.

EXAMPLE 2

The web of material from Example 1 is evaluated as follows:

A 12 mm. diameter disc of the web weighing about 2 mg. is dropped into a small (about 0.5 ml.) quantity of rabbit blood on a watch glass and observed to dissolve immediately.

Three 13 mm. diameter discs of the web are cut and weighed by difference after being inserted into the barrel of 5 ml. plastic syringes. Human blood (1 ml.) is drawn into each of the syringes from a reference supply of blood. The web dissolves in less than one second. No clotting is observed. The pH of both the reference supply of blood and each of the heparinized samples is checked as shown in Table I below by using the pH sensor in a commercial blood gas analyzer.

TABLE I

| Sample | Description | Weight of Heparin Disc | pH of Sample |
| --- | --- | --- | --- |
| A | Reference Blood | none | 7.32 |
| B | Sample 1 | 0.0021 g. | 7.33 |
| C | Sample 2 | 0.0019 g. | 7.33 |
| D | Sample 3 | 0.0017 g. | 7.32 |

Thus, the sodium heparin web does not significantly affect the pH of the blood sample.

EXAMPLE 3

0.8 Ml. of a 25 percent by weight aqueous solution of sodium heparin is expressed into a stirred reactor containing 50 ml. of isopropanol from a syringe through a 22 gauge needle. The resulting microfibers collect and mat around the stirring bar. The mat or web is pressed between two pieces of filter paper, placed on a vacuum filter apparatus covered with a rubber dam and dried by pulling a vacuum on the apparatus.

A portion of this web is removed and tested for solubility in water. It dissolves very rapidly.

EXAMPLE 4

A syringe with a 22 gauge needle is used to extrude 6.2 g. of a 22.5 aqueous solution of sodium heparin into a magnetically stirred reactor containing 120 ml. of anhydrous isopropanol. The mixture is poured into a homogenizer and homogenized for about 2 minutes at high speed. The mixture is transferred to the Buchner funnel of a vacuum filter apparatus, allowed to settle and a vacuum is applied. A piece of filter paper is placed on top of the sodium heparin web or mat, and a rubber dam is used over the Buchner funnel. After the web has been pulled dry under vacuum, it is placed in a vacuum drying over at 85° C. for about 18 hours. The weight of the web is 1.587 g. (1.395 g. theoretical) indicating about 15 percent solvent content.

The web is cut with a 3.8 mm. cork borer to form discs of the heparin web weighing about 2.5 mg. which dissolve very rapidly in blood or water.

EXAMPLE 5

A sample of heparin web is prepared using the method of Example 4. The web is photomicrographed and the dimensions of fibers of the web are measured. The diameter of the fibers range from 3 to 50 microns. The relative lengths of the individual fibers are measured to be at least 20 to 30 times greater than the diameter. Generally the lengths of the fibers are 80 or more times greater than the diameter.

EXAMPLE 6

A 25% aqueous solution of calcium heparin is prepared. A sample (7.2 g.) of the solution is expelled from a syringe through an 18 gauge needle into 200 ml of isopropyl alcohol. Fibers having average length to diameter ratios greater than 80 are formed, collected and dried under vacuum at 50° C. for 16 hours. The web has excellent integrity and dissolves rapidly in water.

A sample of this web is stored at 37° C. under 75% relative humidity for 20 days. The structural integrity of the web is maintained and a sample is observed to dissolve rapidly in water.

A sample of calcium heparin web is sterilized with ethylene oxide. It maintains its physical integrity, ability to disintegrate in water and anticoagulant activity. Blood gas analyses carried out on blood treated with this calcium heparin web compare favorably with those utilizing the sodium heparin webs.

EXAMPLE 7

A. Preparation of Zinc Heparin

A sample of 5 g. of calcium heparin web is dissolved in 20 ml of deionized water. To this solution is added 20 ml of an aqueous solution of 4.4 g. of zinc sulfate heptahydrate. After stirring one-half hour the solution is filtered to remove calcium sulfate. To the filtrate is added 150 ml of methanol, providing a gummy product. The solvents are removed by decantation, the gum is dissolved in 20 ml of water, filtered and reprecipitated with 180 ml of methanol. The precipitate is separated by decantation of solvents, dissolved in 20 ml of water and added to 300 ml of stirred isopropyl alcohol. Solid zinc heparin precipitates and is separated by filtration providing 4.47 g. after air drying.

B. Preparation of Zinc Heparin Web

A solution of 1 g. of zinc heparin in 4 ml of deionized water is prepared. Using a syringe fitted with an 18 gauge needle the solution is injected through a 0.8μ filter into 100 ml of rapidly stirred isopropyl alcohol. The resulting fibers, which have an average length to diameter ratio greater than 20, form a web which is separated by filtration and dried at 105° C. for one hour under vacuum. The total weight of the web is 0.81 g. of zinc heparin.

A small plug of the web is observed to dissolve very rapidly, almost instantaneously, in water.

EXAMPLE 8

A. Preparation of Magnesium Heparin

An aqueous solution of magnesium chloride (300 ml of 5% w/v) is added to a 10 g. sample of purified sodium heparin. The pH of the solution is adjusted to between 6.5 and 7.0 (6.6 measured) by the addition of 0.1 N hydrochloric acid or magnesium hydroxide. Methanol (300 ml) is added and the mixture is stirred for one-half hour. Isopropyl alcohol (150 ml) is added and the mixture is stirred for one-half hour. The magnesium heparin containing-layer is separated by decantation and dissolved in 5% (w/v) aqueous magnesium chloride solution. The solution is diluted with an equal volume of isopropyl alcohol and the magnesium heparin containing-layer is separated by decantation. This layer is dissolved in 1% (w/v) aqueous magnesium chloride solution and the pH is adjusted to 6.5 to 7.0 (6.7 measured) with 0.1 N hydrochloric acid. The solution is diluted with an equal volume of isopropyl alcohol and stirred. The magnesium heparin gradually separates out as a syrup.

The syrup is collected with a syringe and expelled into a swirling bath of isopropyl alcohol. A precipitate of magnesium heparin is formed which is collected on filter paper and dried under ambient conditions to provide 9.5 g. of product.

B. Preparation of Magnesium Heparin Web

Using the magnesium heparin from Step A., a 20% (w/w) solution of magnesium heparin in water is prepared. A sample (10 ml) of this solution is collected in a syringe and expelled through an 18 gauge needle into a swirling bath of isopropyl alcohol. Fibers of magnesium heparin are formed which have an average length to diameter ratio greater than 20. These fibers are collected on filter paper and dried at 60° C. for 30 minutes under vacuum. Several webs are prepared from these fibers.

EXAMPLE 9

A 20% aqueous solution of potassium heparin is prepared. 9 g. of this solution is expelled through an 18 gauge needle into 200 ml of isopropyl alcohol. Fibers having an average length to diameter ratio greater than 20 are formed, collected and dried at 50° C. under vacuum. A plug of the web disintegrates completely in water in less than 5 seconds.

EXAMPLE 10

Lithium heparin is prepared from sodium heparin by substantially the process of Example 8, but utilizing lithium chloride in place of magnesium chloride.

A 25% aqueous solution of the lithium heparin is prepared and a portion (7.2 g.) of this solution is expelled through an 18 gauge needle into 200 ml of isopropyl alcohol. Fibers having an average length to diameter ratio greater than 20 are formed, collected and dried under vacuum at 50° C. for 16 hours. A plug of the web disintegrates completely in water in less than five seconds. The fibers are firm and of excellent quality for the formation of a web.

What is claimed is:

1. A microfiber of an amorphous heparin salt which has an average length to diameter ratio of at least 20.
2. A microfiber according to claim 1 having a density of about 1.8 g/cc and an average length to diameter ratio of at least 80.
3. An open, nonwoven microfibrous web of amorphous heparin salt microfibers, said microfibers having an average length to diameter ratio of at least 20.
4. A microfiber of an amorphous salt of heparin and a cation selected from groups I and II of the periodic table of the elements which has an average length to diameter ratio of at least 20.
5. A microfiber according to claim 4 having a density of about 1.8 g/cc and an average length to diameter ratio of at least 80.
6. An open, nonwoven web of microfibers of an amorphous salt of heparin and a cation selected from groups I and II of the periodic table of the elements, said microfibers having an average length to diameter ratio of at least 20.
7. A microfiber according to claim 1 wherein the salt is a sodium salt.
8. A microfiber according to claim 2 wherein the salt is a sodium salt.
9. A web according to claim 3 wherein the salt is a sodium salt.
10. A microfiber according to claim 1 wherein the salt is a calcium salt.
11. A microfiber according to claim 2 wherein the salt is a calcium salt.
12. A web according to claim 3 wherein the salt is a calcium salt.
13. A microfiber according to claim 1 wherein the salt is a magnesium salt.
14. A microfiber according to claim 2 wherein the salt is a magnesium salt.
15. A web according to claim 3 wherein the salt is a magnesium salt.
16. A microfiber according to claim 1 wherein the salt is a zinc salt.
17. A microfiber according to claim 2 wherein the salt is a zinc salt.
18. A web according to claim 3 wherein the salt is a zinc salt.
19. A microfiber according to claim 1 wherein the salt is a potassium salt.
20. A microfiber according to claim 2 wherein the salt is a potassium salt.
21. A web according to claim 3 wherein the salt is a potassium salt.
22. A microfiber according to claim 1 wherein the salt is a lithium salt.
23. A microfiber according to claim 2 wherein the salt is a lithium salt.
24. A web according to claim 3 wherein the salt is a lithium salt.

* * * * *